United States Patent [19]

Knapp et al.

[11] 3,914,058

[45] Oct. 21, 1975

[54] METHOD FOR INSPECTING LIQUIDS IN TRANSPARENT CONTAINERS

[75] Inventors: Julius Z. Knapp, Somerset; Emanuel B. Hershberg, West Orange, both of N.J.

[73] Assignee: Schering Corporation, Bloomfield, N.J.

[22] Filed: Mar. 3, 1971

[21] Appl. No.: 120,399

Related U.S. Application Data

[63] Continuation-in-part of Ser. No. 12,342, Feb. 17, 1970, Pat. No. 3,627,423.

[52] U.S. Cl. .............................. 356/197; 356/103
[51] Int. Cl.² ........................................ G01N 21/24
[58] Field of Search ........... 250/218, 223, 224, 574; 356/103, 197

[56] References Cited
UNITED STATES PATENTS

| | | | |
|---|---|---|---|
| 2,436,082 | 2/1948 | Stout | 356/197 |
| 3,496,369 | 2/1970 | Makino et al. | 356/197 X |
| 3,528,544 | 9/1970 | Noguchi et al. | 356/197 X |
| 3,627,423 | 12/1971 | Knapp et al. | 356/197 X |

Primary Examiner—Vincent P. McGraw
Assistant Examiner—F. L. Evans
Attorney, Agent, or Firm—Lerner, David, Littenberg & Samuel

[57] ABSTRACT

A method for detecting the presence of particulate matter in a liquid contained in a transparent container is disclosed as well as apparatus for performing the method. The preferred method includes the steps of rotating the container at a first relatively low rate of speed, rapidly stopping the container, immediately thereafter inspecting the rotating liquid in the container to determine if relatively lightweight particles are moving in the rotating liquid, rotating the container again to bring it to a second relatively high rate of speed, again rapidly stopping the container, and immediately thereafter inspecting the rotating liquid to determine if there are any relatively heavy particles moving in the rotating liquid.

6 Claims, 4 Drawing Figures

INVENTORS
JULIUS Z. KNAPP
BY EMANUEL B. HERSHBERG

LERNER, DAVID & LITTENBERG
ATTORNEYS

METHOD FOR INSPECTING LIQUIDS IN TRANSPARENT CONTAINERS

CROSS-REFERENCES TO RELATED APPLICATIONS

This application is a continuation-in-part of U.S. Pat. application No. 12,342, filed Feb. 17, 1970 now U.S. Pat. No. 3,627,423. The aforesaid U.S. patent application will hereinafter be referred to as the "parent" application.

FIELD OF THE INVENTION

This invention relates to methods and apparatus especially suited for detecting the presence of fine particulate matter (below 50 microns) in liquids contained in transparent containers and the like, and particularly to such methods and apparatus for detecting the presence of particulate matter in ampoules and vials.

BACKGROUND OF THE INVENTION

The art of detecting the presence of particulate matter in liquids contained in closed transparent containers, such as vials and ampoules, is a relatively old and crowded one as evidenced by, for example, U.S. Pat. Nos. 1,648,369; 2,132,447; 2,531,529; 2,635,194; and 3,415,997. One widely accepted method of detection which, in fact, is referred to in each of the foregoing cited U.S. patents as well as in the parent application, includes the steps of rotating a container to be inspected, then rapidly stopping the rotational movement of the container, and immediately thereafter inspecting the rotating fluid in the container to detect any moving particles. This simplifies the detection of particles since moving particles can be relatively easily detected. It also prevents the false detection of imperfections in the container or particles on the outside of the container as particles in the liquid since such imperfections or outside particles would not be moving.

One known method employing the above principle begins with rotating the container at a desired high rate for a sufficient time such that the liquid in the container is rotating at a sufficiently rapid rate to cause any particles desired to be detected to rotate in the liquid when the container rotation is rapidly stopped. The inspection begins as soon as the rotation of the container has been stopped and continues for at least approximately 5 seconds. This is a relatively long inspection time and quite fatiguing. However, this continual inspection is necessary because the liquid must be rotated to a substantially high rate so that heavy particles, such as glass particles, will be lifted from the bottom of the container and rotated in the fluid. At such a relatively high rate, material fibers or specks which may be present because of improper cleaning, dirty air in the clean room, chemical reaction etc., may go undetected because they are difficult to detect when moving at such high speeds. Also, as discussed more fully hereinafter, the lightweight material fibers or specks may stick to the wall or walls of the container and thus go undetected. The operator must wait until the rotating fluid moves down from its speed of, for example, 1,000 r.p.m. (revolutions per minute), to, for example, approximately 300 r.p.m., and continuously watch the rotating fluid during this time to determine if particulate matter of any size or weight is present.

It is the general object of the present invention to provide an improved method and apparatus for detecting the presence of particulate matter in liquids contained in transparent containers and the like. It is a more specific object of the present invention to provide such a method and apparatus for performing the method which is more reliable, less fatiguing, and permits the inspection to be carried out in a shorter time than previous methods.

SUMMARY OF THE PRESENT INVENTION

There is provided according to the present invention a method of detecting particulate matter in liquid in transparent containers which comprises rotating the container at least twice to bring the liquid to at least two different rotational speeds, stopping the rotation of the container after each of the two different rotational speeds have been reached, and inspecting the rotating fluid in the container immediately after it has been stopped after each of its said rotations to determine if particulate matter is present. In addition to facilitating the detection of the particulate matter, the present method permits the classification of the particulate matter according to its density.

In accordance with the preferred method of the present invention, the container is first rotated at a relatively low speed at which relatively lightweight particles can be easily detected, rapidly stopped, inspected, rotated at a second higher speed at which relatively heavy particles can be easily detected, rapidly stopped, and inspected. Preferably, the inspection steps in all variations of the present method include the utilization of electro-optical means, such as a television camera and receiver.

It has been found that the present method can be performed in a much shorter time than previous methods, is less fatiguing for the inspectors when inspectors are used, and is more reliable than previous methods. One reason for the increased reliability is believed to be due to the fact that inspectors have advised that continuous performance of the present method is much less fatiguing than continuous performance of other methods. An additional reason for such increased reliability when the test is conducted by first spinning the container at a relatively low speed and thereafter at a relatively high speed is believed to reside in the fact that the lightweight particles, such as fibers from sanitary clothing, etc., are all present during the first inspection period when they are to be detected but a substantial amount of such lightweight particles are not present during the second inspection which is for the heavy particles. This is due to the fact that a substantial amount of the lightweight particles are "spun-off" when rotating the liquid to bring it to its relatively higher speed. During such rapid rotation, the lightweight particles rapidly rise to the top of the fluid and are centrifuged to the wall or walls of the container whereby a substantial proportion of them stick to the wall or walls. Conversely, if the first inspection is at the relatively high speed, the lightweight particles which have stuck to the wall or walls when rotating at the relatively high speed would not be detected during the second inspection period for the lightweight particles when the fluid is rotating at the relatively lower rate.

The present invention also comprises apparatus for performing the method. The apparatus, preferably, also includes means permitting a suspect container to be inspected more than once if the operator so desires.

DESCRIPTION OF THE PREFERRED EMBODIMENT

Figure 1:
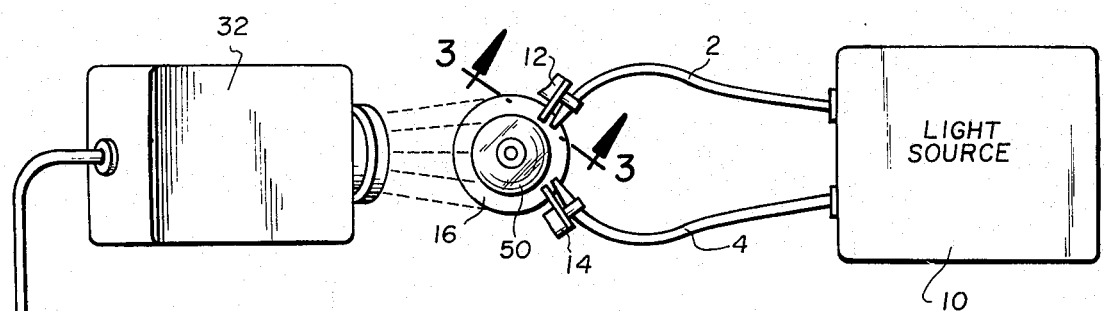
FIG. 1 is a top plan view of the apparatus with the viewing receiver in front elevational view.
Figure 3:
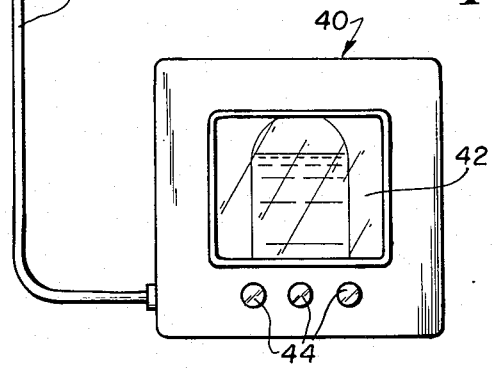
FIG. 3 is a sectional view taken at 3—3 of FIG. 1.
Figure 3:
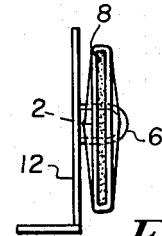

The illustrated embodiment of the apparatus of the present invention comprises a modification of the apparatus of the parent application and it is to be clearly understood that the following description is by way of example only and should not be regarded in anyway as intended as a limitation to the scope of the invention since the illustrated embodiment of the invention is only exemplary and the apparatus may take different forms. Referring now to the drawings, in which like reference numerals refer to similar parts throughout, cables 2 and 4, each having an outer protective shield 6 and an optical glass fiber bundle 8 within shield 6, are connected at one of their ends to light source 10. They are mounted at their opposite ends in fixed position above turntable 16 and behind baffles 12 and 14, respectively. The ends of cables 2 and 4 in light source 10 are open and receive light from the light source and transmit it through the glass fiber bundles 8 to the open ends of cables 2 and 4 at baffles 12 and 14. Any light source having an intensity sufficient to illuminate the liquid and particles and compatible with the viewing means may be employed. For example, a 150 Watt 21 Volt, incandescent light, such as a General Electric type EKE, has been found to be quite suitable.

Turntable 16 is mounted on a shaft 18 which is driven, as hereinafter described, by a motor 20 fixedly mounted on a support 22. For purposes more apparent hereinafter, shaft 18 is vertically movable through motor 20 by lever 24. Lever 24 is pivoted at 26 to shaft 18 and to fixed support 30 at 28.

Figure 2:
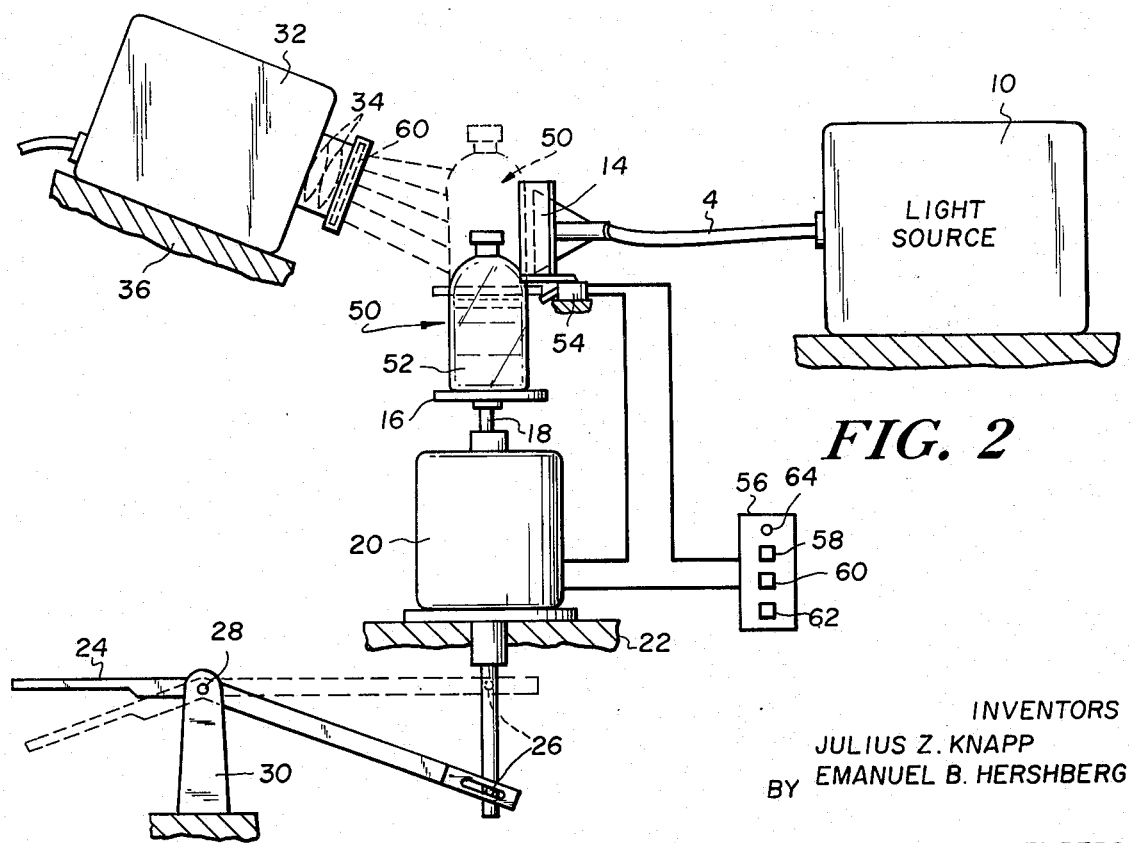
FIG. 2 is a side elevational view of the apparatus of FIG. 1, with the viewing receiver omitted.

An electronic or television camera 32 having a viewing lens 34 is mounted on a fixed support 36 so that the viewing lens 34 is tilted downwardly to provide a viewing range and angle extending from camera 32 to turntable 16 when the turntable is elevated to the phantom line position shown in FIG. 2. Camera 32 is connected by a cable 38 to viewer 40 which has a viewing screen 42. The knobs 44 on viewer 40 provide the necessary picture adjustments as are conventional on the preferred type of electro-optical equipment employed, such as an iconoscope.

With turntable 16 lowered to the solid line position shown in FIG. 2, sealed container 50 containing solution 52 to be inspected for particles is placed on turntable 16 and the turntable is elevated, by depressing lever 24, to the phantom or dotted lines position shown in FIG. 2. It will be appreciated that automatic positioning and elevating means could be employed. Before container 50 is placed on turntable 16 and elevated, light source 10, camera 42 and viewer 40 are turned on. Thus, when the container 50 is elevated, solution 52 is in the path of the light emanating from the ends of fiber bundles 8 angularly toward the viewing axis of lens 34 of camera 32. When the solution 50 is rotating, the sides of any particle in solution 52 are illuminated by the light rays from fiber bundles 8 and such illumination is detected by camera 32 and transmitted to screen 42 of viewer 40.

Lens 34 of camera 32 may be adjusted to a desired resolving power by screen 60 or by electro-optical techniques or in combination. The patterned openings of optical screen 60 may, for example, transmit particle images above a certain size, for example, ten to fifteen microns, but will block the transmission of particle images of smaller sizes. Thus, the operator, if a human operator is used, when seeing a particle or particles imaged on screen 42 can reject the container undergoing inspection, if this is the object when a particle is present, and pass those containers where there is no particle imaged on the screen. As noted hereinbefore, when the operator sees a particle image which is not moving across the screen, the operator immediately knows that the imaged particle is either on the outside of the container or is a flaw in the glass and the container is not rejected.

Figure 4:
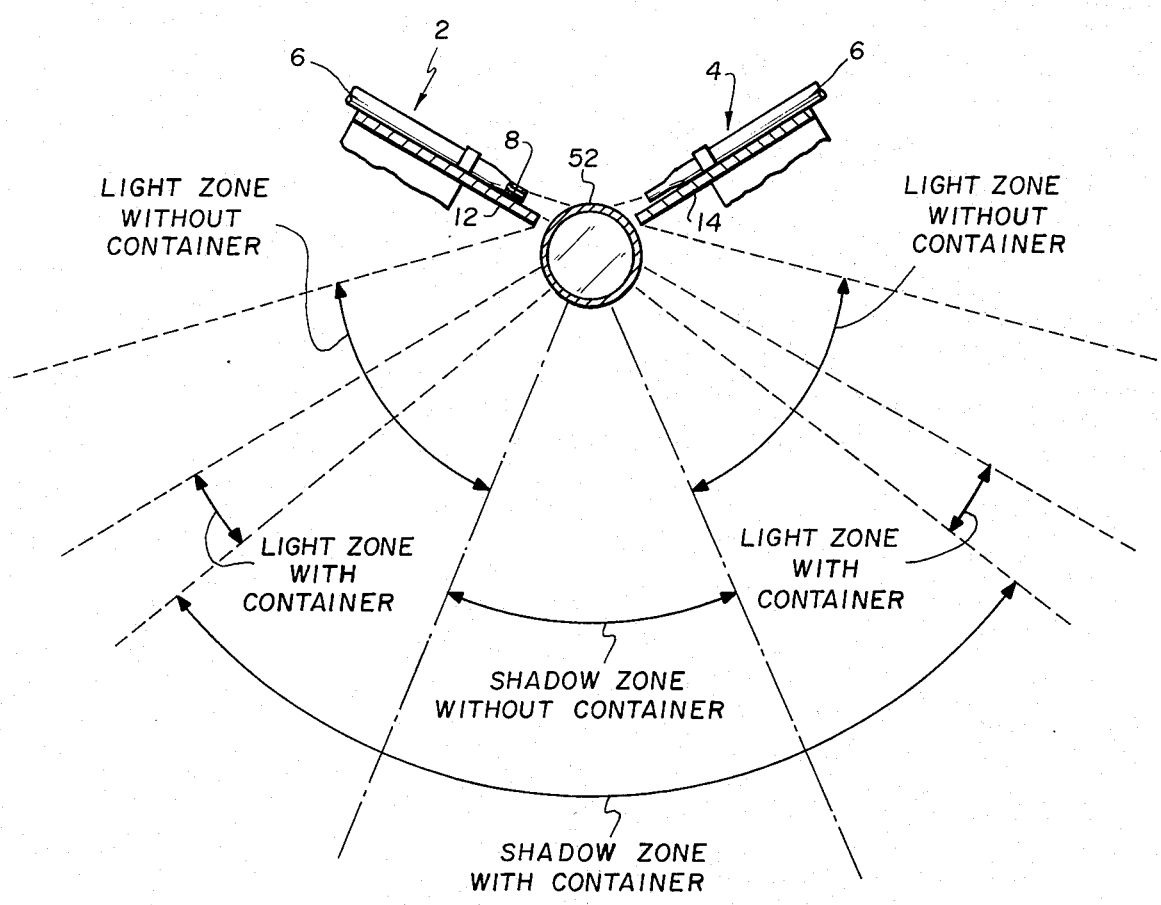
FIG. 4 is an enlarged view showing, schematically, the passage of the light through the container and liquid in the instant invention.

As brought out in the parent application, the surface of any particles in the solution is illuminated both by direct and reflected light. To provide such side illumination, the light sources are angularly disposed at both sides of the viewing axis of the device and the solution is viewed for contaminating particles from the other side of the container. This phenomena is illustrated in FIG. 4. The beams of light from fiber bundles 8 pass through the wall of container 50 and intersect in solution 52. The width of the beam from each of fiber bundles 8 is preferably of a width not less than 5% and not more than 75% of the diameter of the container to be measured when light sources of normal intensity are used. The width may be smaller with light sources of higher intensity, for example, an arc, and wider when the intensity is extremely low. The height of such beams, as they enter the solution, is approximately at the height of such solution. After the light beams intersect, the beams strike the inner wall of the container and a portion of the light passes through the container wall while a portion is reflected into the solution and strikes the inner wall at an acute angle and is multiply reflected in the container. Such reflection of the light beams illuminates the solution in the container. Such light, illuminating the solution, is picked up by any moving particles and forms viewable particle images.

The illumination of the solution and the reflection of the light beams by the inner wall of the container are controlled by the angle at which the light beams are directed toward container 50 and solution 52 therein. This angle is adjusted so that, in an angular area radiating angularly outwardly from container 50 at an angle of about 30°, no light is emitted from container 50 or solution 52. Thus, insofar as light from cables 2 and 4 are concerned there is an angularly shaped light-less area, or shadow zone, and it is in this shadow zone that the viewing means is positioned.

The novel apparatus of this invention requires means for sequential control of the rate of rotation. This sequential controller may be adapted to a manual or automatic inspection mode. The manual system is depicted as control panel 56. In a fully automated inspection system, the functions of both the sequence controller 56 and the decisions of the human operator could be effected by presently available computer circuitry. Panel 56 includes three controls illustrated as push buttons 58, 60 and 62.

When turntable 16 is lifted to the phantom line position shown in FIG. 2, it trips a microswitch 54 which activates the control panel 56. This could be accompanied by a, for example, green light (not shown) being turned on on panel 56.

The preferred method of the present invention will now be described in connection with the illustrated apparatus by way of example only and it is therefore to be clearly understood that the following description is not to be considered in anyway as intended as a limitation the scope of the method of the invention since it may be performed differently and practiced with other substantially different apparatus. In accordance with the present method, as soon as the control panel is activated, the operator depresses button 58 which activates motor 20 and causes the table 16 to rotate at a first rate for a sufficient time to cause the solution 52 to rotate at, for example, 300 r.p.m. Turntable 16 is then automatically rapidly stopped by suitable circuitry (not shown) associated with panel 56 and brake means (not shown) associated with motor 20, and the liquid is immediately inspected by the operator. The operator then depresses button 60 which causes the motor 20 to again rotate turntable 16 but to a much higher rate and for a time sufficient to cause the solution 52 to rotate at, for example, approximately 1,500 r.p.m. When this higher rate is reached, the table is again automatically rapidly stopped and the operator again inspects the liquid in the container. The present method may, for example, be most advantageously performed when the second rate of rotation is from two to ten times the first rate.

The inspection time in both instances is relatively short, from one-half to one and one-half seconds. In fact, it has been found that the total time for completely inspecting the liquid in a container with the present method and apparatus may be less than three seconds. Thus, for the inspection of a 2 ml. multiple dose vial containing 2 ml. of liquid it takes approximately 30 milliseconds to bring the solution 50 to its first speed or approximately 300 r.p.m. with the selected motor 20. The inspection thereafter takes approximately 1 second. The time required to then bring the solution to a speed of approximately 1,500 r.p.m. is about 60 milliseconds, and the inspection thereafter also takes approximately 1 second.

The lighter particles such as lint, fibers, etc. require less rotational energy to set them in motion, and hence are detected following braking of the first and lower rotational speed while heavier glass or metal particles require the higher speeds in order to impart rotational momentum to them. Conversely, at too high rotational speeds, lighter particles such as fibers may be spun off to the side of the container as noted previously and thereby escape detection.

When the desired inspection time has expired in each instance, a red light 64 lights advising the operator to either start the second rotation if the first inspection has been completed or advance or reject the container if the second inspection has been completed.

The third control 62 is operated when it is desired to halt the automatic advance of a container being inspected when automatic advancing apparatus (not shown) is used. Thus, in the case of an automated system in which the container is replaced by a second container as soon as sufficient time for the second inspection period has elapsed, control 62 controls circuitry (not shown) which stops the otherwise automatic advance and permits the container already being inspected to be again inspected.

It has been found that lightweight particles such as material fibers and specks (fibers being identified as specks having a length more than 10 times their width) are detected during the first inspection period while heavier particles, such as particles of glass, as detected during the second inspection.

It will be appreciated that the present apparatus could be fully automated by any number of well known means to cause the turntable 16 to be automatically rotated at a first speed for a desired time as soon as microswitch 54 is actuated, stopped for approximately one to two seconds, rotated at a second speed for a desired time, stopped for approximately 1 to 2 seconds, and then advanced unless an operator depresses a button causing the container being inspected to recycle. If automatic detection means (not shown) are used, such recycling may be effected when something has been detected but not enough to trigger a reject mechanism or the like.

It will also be apparent that the method of the present invention may comprise a plurality of different inspection periods within one inspection cycle. Thus, it can be advantageously employed whenever it is found that different particles desired to be detected can readily be detected at a plurality of different rotational rates peculiar to each of the different types of particles.

It is to be clearly understood that the present description has been by way of example only and is not intended as a limitation to the scope of the invention as defined by the appended claims.

What we claim is:

1. A method for detecting particulate matter in a liquid in a transparent container which particulate matter may include first particles which will move in the liquid when the liquid is rotated at a first rate and can be easily detected when the liquid is rotating at said first rate, and second particles which will move in the liquid when the liquid is rotated at a second rate different from said first rate and can be easily detected when said liquid is moving at said second rate, said first particles being difficult to detect when the liquid is rotating at said second rate and said second particles being difficult to detect when the liquid is rotating at said first rate, comprising the steps of rotating the container to bring the liquid to at least both said first and second rates of rotation, rapidly stopping the rotation of the container after the liquid has reached each of its said first and second rates of rotation, and immediately inspecting the rotating liquid after each said stopping, said first rate of rotation of said liquid being lower than the said second rate and the said liquid being brought to its first rate of rotation, inspected, then brought to its second rate of rotation and again inspected.

2. A method according to claim 1, wherein said second rate is from two to ten times the said first rate.

3. A method according to claim 1, wherein the step of inspecting the fluid after it has been rapidly stopped includes the use of electro-optical inspection means.

4. A method according to claim 1, wherein the steps of inspecting the liquid each comprise projecting at least two light beams through the container so that they intersect within the liquid and exit therefrom and delineate an angular shadow zone radiating outwardly from said container, and viewing the liquid from a position in said shadow zone and off the path of either of said light beams.

5. A method according to claim 4, wherein said viewing position is also outside of the space defined by the planes of the upper and lower surfaces of the liquid.

6. A method according to claim 4, wherein said light beams illuminate particles to form particle images in said shadow zone, said particle images being passed through means to prevent the passage of those particle images having less than a specified size.

* * * * *